(12) United States Patent
Jiang

(10) Patent No.: US 12,526,843 B2
(45) Date of Patent: Jan. 13, 2026

(54) TRANSMISSION CONTROL METHOD, APPARATUS, AND COMMUNICATION DEVICE

(71) Applicant: VIVO MOBILE COMMUNICATION CO., LTD., Dongguan (CN)

(72) Inventor: Lei Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 393 days.

(21) Appl. No.: 18/099,299

(22) Filed: Jan. 20, 2023

(65) Prior Publication Data

US 2023/0156799 A1    May 18, 2023

Related U.S. Application Data

(63) Continuation of application No. PCT/CN2021/108166, filed on Jul. 23, 2021.

(30) Foreign Application Priority Data

Jul. 24, 2020   (CN) .......................... 202010725644.2

(51) Int. Cl.
  *H04W 74/0816*  (2024.01)
  *H04W 72/12*    (2023.01)
  *H04W 74/08*    (2024.01)

(52) U.S. Cl.
  CPC ....... *H04W 74/0816* (2013.01); *H04W 72/12* (2013.01); *H04W 74/0866* (2013.01)

(58) Field of Classification Search
  CPC ... H04W 16/14; H04W 72/12; H04W 72/541; H04W 74/0816; H04W 74/0866
  See application file for complete search history.

(56) References Cited

U.S. PATENT DOCUMENTS

| 2012/0051338 | A1* | 3/2012  | Seok ............... H04W 74/0816 370/337 |
| 2014/0376519 | A1  | 12/2014 | Yang et al. |
| 2015/0312793 | A1  | 10/2015 | Jeon et al. |
| 2016/0066349 | A1* | 3/2016  | Seok ............... H04W 74/0833 370/338 |

(Continued)

FOREIGN PATENT DOCUMENTS

| CN | 101154986 C | 4/2008 |
| CN | 103299569 A | 9/2013 |

(Continued)

OTHER PUBLICATIONS

International Search Report issued in corresponding International Application No. PCT/CN2021/108166, mailed Sep. 22, 2021, 4 pages.

(Continued)

*Primary Examiner* — Kashif Siddiqui
(74) *Attorney, Agent, or Firm* — IPX PLLC

(57) ABSTRACT

A transmission control method, a transmission control apparatus, and a communication device are provided. A transmission control method, performed by a communication device, includes: canceling, in a case that a Request-To-Send (RTS) message or a Clear-To-Send (CTS) message meets a preset condition, configured transmission.

10 Claims, 4 Drawing Sheets

In a case that a terminal detects an RTS message sent from a serving base station without being required to send a CTS message, the terminal skips performing a specific detection within a channel occupancy time indicated by the RTS message

(56) References Cited

U.S. PATENT DOCUMENTS

2016/0088618 A1* 3/2016 Barriac ............ H04W 74/0816
                                                    370/329
2017/0026162 A1   1/2017 Nabetani et al.
2017/0041956 A1*  2/2017 Abraham .......... H04W 74/0816
2017/0150520 A1   5/2017 Söder et al.

FOREIGN PATENT DOCUMENTS

| CN | 103312697 A | 9/2013 |
| CN | 104170508 A | 11/2014 |
| CN | 105264964 A | 1/2016 |
| CN | 107852753 A | 3/2018 |
| CN | 107919950 A | 4/2018 |
| CN | 110933762 A | 3/2020 |

OTHER PUBLICATIONS

First Office Action issued in related Chinese Application No. 202010725644.2, mailed Aug. 30, 2023, 7 pages.
Second Office Action issued in related Chinese Application No. 202010725644.2, mailed Feb. 27, 2024, 4 pages.
Supplemental search report issued in related Chinese Application No. 202010725644.2, mailed Apr. 26, 2024, 3 pages.
Research In Motion UK Limited, "Handling of a SR collision with ACK/NACK repetition", 3GPP TSG-RAN WG2 Meeting #77bis, R2-121282, Mar. 2012, 4 pages.
Sony, "Channel access for NR unlicensed operations", 3GPP TSG RAN WG1 #96bis, R1-1904250, Apr. 2019, 5 pages.

* cited by examiner

A communication device cancels, in a case that a first message meets a preset condition, configured transmission 21

In a case that a terminal detects an RTS message sent from a serving base station without being required to send a CTS message, the terminal skips performing a specific detection within a channel occupancy time indicated by the RTS message 31

TRANSMISSION CONTROL METHOD, APPARATUS, AND COMMUNICATION DEVICE

CROSS-REFERENCE TO RELATED APPLICATIONS

This application is a continuation of International Application No. PCT/CN2021/108166, filed on Jul. 23, 2021, which claims priority to Chinese Patent Application No. 202010725644.2 filed on Jul. 24, 2020. The entire contents of each of the above-referenced applications are expressly incorporated herein by reference.

TECHNICAL FIELD

This application relates to the field of communications technologies, and specifically, to a transmission control method, an apparatus, and a communication device.

BACKGROUND

In the related art, a channel access may be performed by using a handshake mechanism in a shared spectrum such as an unlicensed band. However, in this case, a handshake signal, such as a Request-To-Send (RTS) message and/or a Clear-To-Send (CTS) message, may collide with other transmission signals, which affects normally performing a communication process.

SUMMARY

An objective of embodiments of this application is to provide a transmission control method, an apparatus, and a communication device.

According to a first aspect, a transmission control method is provided, and includes:
  canceling, by a communication device in a case that a first message meets a preset condition, configured transmission, where
  the first message includes at least one of a request-to-send RTS message or a clear-to-send CTS message.

According to a second aspect, a transmission control method is provided, and includes:
  skipping, by a terminal in a case that the terminal detects an RTS message without being required to send a CTS message, performing a specific detection within a channel occupancy time indicated by the RTS message.

According to a third aspect, a transmission control apparatus is provided, and includes:
  a canceling module, configured to, in a case that a first message meets a preset condition, cancel configured transmission, where
  the first message includes at least one of an RTS message or a CTS message.

According to a fourth aspect, a transmission control apparatus is provided, and includes:
  a control module, configured to skip, in a case that a terminal detects an RTS message without being required to send a CTS message, performing a specific detection within a channel occupancy time indicated by the RTS message.

According to a fifth aspect, a communication device is provided, including a processor, a memory, and a program or an instruction stored in the memory and capable of being run on the processor, and the program or the instruction, when executed by the processor, implements the steps of the method according to the first aspect, or implements the steps of the method according to the second aspect.

According to a sixth aspect, a readable storage medium is provided, where the readable storage medium stores a program or an instruction, and the program or the instruction, when executed by a processor, implements the steps of the method according to the first aspect, or implements the steps of the method according to the second aspect, or implements the steps of the method according to the third aspect.

According to a seventh aspect, a chip is provided, where the chip includes a processor and a communication interface, the communication interface is coupled with the processor, and the processor is configured to run a program or an instruction, to implement the steps of the method according to the first aspect, or implements the steps of the method according to the second aspect.

In the embodiments of this application, a communication device, such as a terminal or a network side device, may cancel, in a case that an RTS message and/or a CTS message meet a preset condition, configured transmission. For example, in a case that a transmission resource of an RTS message and/or a CTS message collides with a configured transmission resource, the terminal may cancel configured uplink transmission.

DETAILED DESCRIPTION

The following describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and so on are intended to distinguish between similar objects but do not indicate a particular order or sequence. It should be understood that the data so used may be interchanged in an appropriate condition, so that the embodiments of this application can be implemented in a sequence other than those illustrated or described herein. In addition, objects distinguished by "first" and "second" are usually a same type, and a quantity of the objects is not limited, for example, a first object may be one or may be a plurality. In addition, "and/or" in this specification and the claims indicates at least one of the connected objects. A character "/" usually indicates an "or" relationship between the associated objects.

Figures 1, 2, 3:
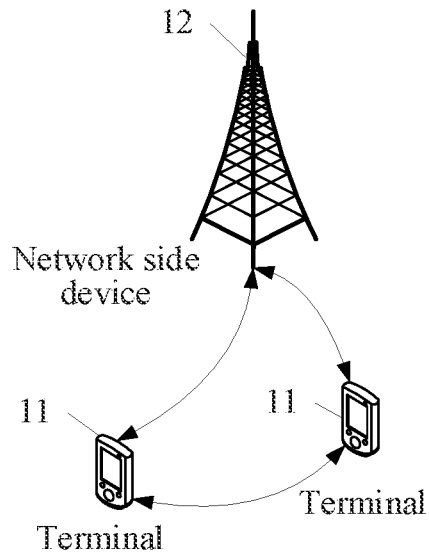
FIG. 1 is a block diagram of a wireless communication system according to an embodiment of this application.
FIG. 2 is a flowchart of a transmission control method according to an embodiment of this application.
FIG. 3 is a flowchart of another transmission control method according to an embodiment of this application.

It should be noted that, the technologies described in the embodiments of this application are not limited to a Long Term Evolution (LTE)/LTE-Advanced (LTE-A) system, and may be further applied to other wireless communication systems, such as Code Division Multiple Access (CDMA), Time Division Multiple Access (TDMA), Frequency Division Multiple Access (TDMA), Orthogonal Frequency Division Multiple Access (OFDMA), Single-Carrier Frequency-Division Multiple Access (SC-FDMA), and other systems. In the embodiments of this application, the terms "system" and "network" may usually be used interchangeably. The described technology can be applied to the systems and radio technologies mentioned above, and can also be applied to other systems and radio technologies. However, the following description describes a New Radio (NR) system for an exemplary objective, and uses NR terms in most of the following description, though such technologies may also be applied to applications except an NR system application, such as a 6th Generation (6G) communication system, FIG. 1 shows a block diagram of a wireless communication system that may be applied to an embodiment of this application; The wireless communication system includes a terminal 11 and a network device 12. The terminal 11 may also be referred to as a terminal device or a User Equipment (UE). The terminal 11 may be a mobile phone, a tablet personal computer, a laptop computer referred to as a notebook computer, a Personal Digital Assistant (PDA), a palm personal computer, a netbook, an Ultra-Mobile Personal Computer (UMPC), a Mobile Internet Device (MID), a wearable device or a Vehicle User Equipment (VUE), a Pedestrian User Equipment (PUE), or other terminal side devices. The wearable device includes: a smart watch, an earphone, glasses, and the like. It should be noted that, a specific type of the terminal 11 is not limited in the embodiments of this application. The network side device 12 may be a base station or a core network, where the base station may be referred to as a node B, an evolved node B, an access point, a Base Transceiver Station (BTS), a radio base station, a radio transceiver, a Basic Service Set (BSS), an Extended Service Set (ESS), a node B, an evolved Node B (eNB), a home node B, a home evolved node B, a WLAN access point, a Wi-Fi node, a Transmitting Receiving Point (TRP), or another suitable term in the field. As long as the same technical effects can be achieved, the base station is not limited by a specific technical term. It should be noted that, a base station in the NR system is merely used as an example in the embodiments of this application, but a specific type of the base station is not limited.

For ease of comprehension of the embodiments of this application, the following contents are first described.

In a communication system, a shared spectrum, such as an unlicensed band, may be used as a supplement to a licensed band to help an operator perform capacity expansion on a service. To be consistent with NR deployment and maximize an unlicensed access based on NR as much as possible, the unlicensed band may work in bands of 5 GHz, 37 GHz, and 60 GHz. The unlicensed hand is shared by a plurality of Radio Access Technology (RAT), such as a Wi-Fi, a radar, an LTE-based Licensed-Assisted Access (LTE-LAA) to an unlicensed spectrum. Therefore, in some countries or areas, the unlicensed band that is used needs to comply with supervision regulations, to ensure that all devices may share the resource fairly, such as a Listen Before Talk (LBT) channel, or a Maximum Channel Occupancy Time (MCOT). When a transmission node needs to send information, LBT is required to be performed first on a specified radio channel, and an Energy Detection (ED) is performed in a surrounding wireless transmission environment. When detected energy is lower than a specific threshold, the channel is determined as idle, and then transmission is enabled to start. When the detected energy is higher than or equal to the specified threshold, the channel is determined as busy, and the transmission node cannot perform sending. The transmission node may be a base station, a UE, a Wi-Fi Access Point (AP), or the like. After the transmission node starts transmission, an occupied channel time cannot be longer than the MCOT.

LBT can resolve some problems of channel interference. However, because LBT is all initiated by a transmitting end node, a problem of a hidden node of a receiving end node cannot be resolved. For example, LBT is performed by a gNB1 before sending data, and it is found through listening that a channel is idle, so the gNB1 sends data to a UE1 and the UE1 receives the data. In this case, a UE2 has data needing to be sent, and LBT is performed. Because the gNB1 is relatively distant, and the UE1 is in a receiving state, the UE2 finds through listening that the channel is idle, and starts to send the data. However, because the UE2 is quite close to the UE1, the UE1 can receive information sent from the UE2. In this case, the UE1 suffers from interference when receiving the data from the gNB1. The UE2 is a hidden node of the UE1.

To avoid the problem of the hidden node, for transmission of the unlicensed band, a handshake mechanism of RTS/CTS or a transmission request/transmission confirming mechanism is imported. A source node sends an RTS message before data transmission, and the RTS message carries a Network Allocation Vector (NAV) value and an address of a destination node, indicating a time for the node to occupy a channel. All nodes receiving the RTS message do not attempt to transmit data within an NAV time. After receiving the RTS message, the destination node replies with a CTS message, and the CTS message carries the NAV value and an address of the source node. All nodes receiving the CTS message do not attempt to perform transmission within the NAV time, thereby avoiding a problem of a hidden node surrounding the destination node.

To ensure that a communication process is performed smoothly, the following problems further need to be resolved:

1) A resource of RTS/CTS may collide with a resource of another uplink/downlink configured transmission, that is, there is an overlap between the resources. 2) An RTS initiating node may be a gNB, or may be a UE, and a corresponding CTS transmission node may be a UE or may be a gNB. All nodes need to detect an RTS message, and further need to detect a CTS message. In the NR, considering a manner of scheduling transmission, a UE that detects a CTS message without sending an RTS message cannot perform uplink transmission with a gNB. As a result, configured uplink transmission cannot be performed. 3) When an unnecessary detection is performed within a channel occupancy time indicated by an RTS message or a CTS message, power consumption of a UE increases.

In the embodiments of this application, a CTS message may also be referred to as a confirm to send message, or referred to as a confirm to transmit message.

The following describes the transmission control method provided in the embodiments of this application in detail with reference to the accompanying drawings by using specific embodiments and application scenarios thereof.

Referring to FIG. 2, FIG. 2 is a flowchart of a transmission control method according to an embodiment of this application. The method is applied to a communication device, and the communication device may be a terminal, or may be a network side device. As shown in FIG. 2, the method includes the following steps:

Step 21: A communication device cancels, in a case that a first message meets a preset condition, configured transmission.

In this embodiment of this application, the first message may include at least one of an RTS message or a CTS message.

In some embodiments, the foregoing step 21 may include: A terminal cancels, in a case that a transmission resource of the first message collides with a configured uplink transmission resource, transmission on the configured uplink transmission resource. In this way, a problem that a handshake signal may collide with other transmission signals when a channel access is performed by using a handshake mechanism in a shared spectrum can be resolved, thereby ensuring that a handshake process is completed as quickly as possible upon channel listening and ensuring that a communication process is performed smoothly.

For example, a network side device, such as a gNB in NR, may be configured with a semi-persistent uplink transmission resource. The terminal may perform uplink transmission such as configured grant uplink transmission CG UL transmission on the configured semi-persistent uplink transmission resource. Because these semi-persistent configured resources may not be used always, a transmission resource of RTS/CTS may overlap with these CG UL resources, to ensure that the handshake process is completed as quickly as possible upon channel listening. Therefore, when RTS/CTS transmission collides with the configured transmission, the terminal may cancel the configured uplink transmission.

In some embodiments, the foregoing step 21 may include: The network side device cancels, in a case that a transmission resource of the first message collides with a configured downlink transmission resource, transmission on the configured downlink transmission resource. In this way, a problem that a handshake signal may collide with other transmission signals when a channel access is performed by using a handshake mechanism in a shared spectrum can be resolved, thereby ensuring that a handshake process is completed as quickly as possible upon channel listening and ensuring that a communication process is performed smoothly.

For example, a network side device, such as a gNB in the NR, may be configured with a semi-persistent downlink transmission resource. The gNB may perform downlink transmission such as downlink semi-persistent scheduling DL SPS transmission on the semi-persistent downlink transmission resource. Because these semi-persistent configured resources may not be used always, a transmission resource of RTS/CTS may overlap with these DL SPS resources, to ensure that the handshake process is completed as quickly as possible upon channel listening. Therefore, when the RTS/CTS transmission collides with the configured transmission, the network side device may cancel configured downlink transmission.

In some embodiments, the foregoing step 21 may further include: The terminal cancels, in a case that the terminal receives a CTS message from a serving base station without sending an RTS message, and a time domain resource of Configured Grant (CG) uplink transmission overlaps with a channel occupancy time indicated by the CTS message, the CG uplink transmission.

In some embodiments, the foregoing canceling the CG uplink transmission may include any one of the following:
canceling CG uplink transmission on a time domain resource overlapping with the channel occupancy time; or
canceling CG uplink transmission on all time domain resources overlapping with the channel occupancy time.

In this way, when the time domain resource of the CG uplink transmission of the terminal overlaps with the channel occupancy time indicated by the CTS message, it may be ensured that the handshake process is completed as quickly as possible upon channel listening.

For example, if a UE receives a CTS message sent from a serving base station without sending an RTS message, and a time domain resource of CG uplink transmission of the UE, such as a time domain resource transmitted by a CG Physical Uplink Shared Channel (PUSCH), overlaps with a channel occupancy time indicated by the CTS message, the UE cancels CG UL transmission. In some embodiments, the UE may cancel CG PUSCH transmission overlapping with the channel occupancy time, that is, as long as CG PUSCH overlaps with the indicated channel occupancy time, even if overlapping partially, the CG PUSCH transmission is canceled. In addition, the UE may cancel only a part of transmission that overlaps with the channel occupancy time, for example, only partial CG PUSCH transmission is canceled.

Referring to FIG. 3, FIG. 3 is a flowchart of a transmission control method according to an embodiment of this application, and the method is applied to a terminal. As shown in FIG. 3, the method includes the following steps:

Step 31: In a case that a terminal detects an RTS message sent from a serving base station without being required to send a CTS message, the terminal skips performing a specific detection within a channel occupancy time indicated by the RTS message.

In some embodiments, the specific detection may include at least one of the following:
a detection of a CTS message;
a detection of a Physical Downlink Control Channel (PDCCH); or
a detection of a Semi-Persistent Scheduling (SPS) Physical Downlink Shared Channel (PDSCH).

In this way, unnecessary signal detection operations may be reduced, and power consumption of the terminal is reduced.

For example, if a UE receives an RTS message sent from a serving base station, but the RTS message does not instruct the LTE to send a CTS message, indicating that the serving base station does not transmit data to the UE within an indicated channel occupancy time, the UE does not perform detection operations of a CTS message, a PDCCH, and an SPS PDSCH within the channel occupancy time indicated by the RTS message.

It should be noted that, the transmission control method provided in this application may be further applicable to a scenario of sidelink transmission, that is, a scenario of a communication between terminals. In the scenario of sidelink transmission, the transmission control method includes:

Step 10: A terminal cancels, in a case that a first message meets a preset condition, configured sidelink transmission, where the first message includes at least one of an RTS message or a CTS message.

In some embodiments, in a case that a transmission resource of the first message collides with a configured sidelink transmission resource, transmission on the configured sidelink transmission resource is canceled. In this way, a problem that a handshake signal may collide with other transmission signals when the sidelink transmission is performed by using a handshake mechanism in a shared spectrum can be resolved, thereby ensuring that a handshake process is completed as quickly as possible upon channel listening and ensuring that a communication process is performed smoothly.

In some alternative embodiments, in a case that the terminal receives a CTS message from another terminal without sending an RTS message, and a time domain resource of the sidelink transmission of the terminal overlaps with a channel occupancy time indicated by the CTS message, the sidelink transmission is canceled. In this way, when the time domain resource of the sidelink transmission of the terminal overlaps with the channel occupancy time indicated by the CTS message, it may be ensured that the handshake process is completed as quickly as possible upon channel listening.

In some alternative embodiments, in a case that the terminal detects an RTS message sent from another terminal without being required to send a CTS message, the terminal does not perform a specific detection within the channel occupancy time indicated by the RTS message. For example, if a UE receives an RTS message sent from another UE, but the RTS message does not instruct the UE to send a CTS message, indicating that the another UE does not transmit data to the UE within an indicated channel occupancy time, the UE does not perform a specific detection. In this way, unnecessary signal detection operations may be reduced, and power consumption of the terminal is reduced.

In some embodiments, the specific detection may include at least one of the following:
 a detection of a CTS message;
 a detection of a Physical Sidelink Control Channel (PSCCH);
 a detection of a Physical Sidelink Shared Channel (PSSCH); or
 a detection of a Physical Sidelink Feedback Channel (PSFCH).

It should be noted that, in the transmission control method provided in this embodiment of this application, an execution subject may be a transmission control apparatus, or a transmission control module, in the transmission control apparatus, that is configured to perform the transmission control method. In an embodiment of this application, a transmission control apparatus provided in this embodiment of this application is described by using an example in which the transmission control apparatus performs the transmission control method.

Figure 4:
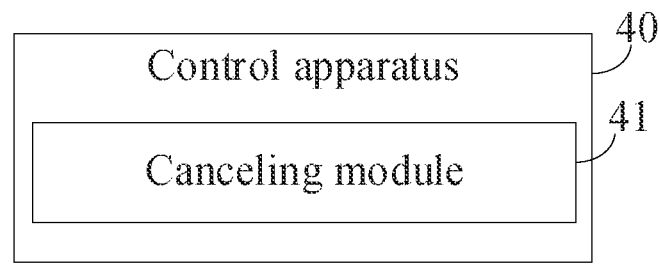
FIG. 4 is a schematic structural diagram of a transmission control apparatus according to an embodiment of this application.

Referring to FIG. 4, FIG. 4 is a schematic structural diagram of a transmission control apparatus according to an embodiment of this application that is applied to a communication device, and the communication device may be a terminal or a network side device. As shown in FIG. 4, the transmission control apparatus 40 includes:
 a canceling module 41, configured to, in a case that a first message meets a preset condition, cancel configured transmission, where
 the first message includes at least one of an RTS message or a CTS message.

In some embodiments, when the transmission control apparatus is applied to a terminal, the canceling module 41 is configured to:
 cancel, in a case that a transmission resource of the first message collides with a configured uplink transmission resource, transmission on the configured uplink transmission resource.

In some embodiments, when the transmission control apparatus is applied to a network side device, the canceling module 41 is configured to:
 cancel, in a case that a transmission resource of the first message collides with a configured downlink transmission resource, transmission on the configured downlink transmission resource.

In some embodiments, the canceling module 41 is configured to:
 cancel, in a case that a terminal receives a CTS message from a serving base station without sending an RTS message, and a time domain resource of CG uplink transmission of the terminal overlaps with a channel occupancy time indicated by the CTS message, the CG uplink transmission.

In some embodiments, the canceling module 41 is configured to perform any one of the following:
 canceling CG uplink transmission on a time domain resource overlapping with the channel occupancy time; or
 canceling CG uplink transmission on all time domain resources overlapping with the channel occupancy time.

The transmission control apparatus 40 provided in this embodiment of this application can implement all processes implemented by the method embodiment shown in the foregoing FIG. 2, and achieve the same technical effects. To avoid repetition, details are not described herein again.

Figure 5:
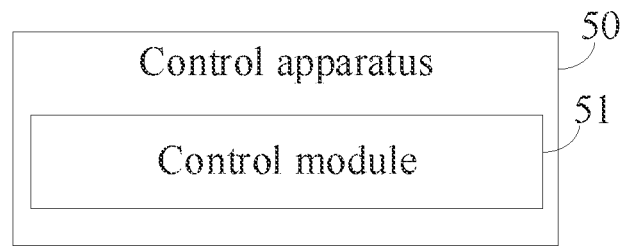
FIG. 5 is a schematic structural diagram of another transmission control apparatus according to an embodiment of this application.

Referring to FIG. 5, FIG. 5 is a schematic structural diagram of a transmission control apparatus according to an embodiment of this application that is applied to a terminal. As shown in FIG. 5, the transmission control apparatus 50 includes:
 a control module 51, configured to skip, in a case that the terminal detects an RTS message sent from a serving base station without being required to send a CTS message, performing a specific detection within a channel occupancy time indicated by the RTS message.

In some embodiments, the specific detection may include at least one of the following:
 a detection of a CTS message;
 a detection of a PDCCH; or
 a detection of an SPS PDSCH.

The transmission control apparatus in this embodiment of this application may be an apparatus, or may be a component, an integrated circuit, or a chip in the terminal. The apparatus may be a mobile terminal or may be a non-mobile terminal. For example, the mobile terminal may include, but not limited to, the foregoing enumerated types of the terminal 11, and the non-mobile terminal may be a server, a Network Attached Storage (NAS), a Personal Computer (PC), a Television (TV), a teller machine, a self-service machine, or the like. This is not specifically limited in this embodiment of this application.

The transmission control apparatus in this embodiment of this application may be an apparatus with an operating system. The operating system may be an Android operating system, may be an iOS operating system, or may be another possible operating system, and is not specifically limited in the embodiments of this application.

The transmission control apparatus 50 provided in this embodiment of this application can implement all processes implemented by the method embodiment shown in the foregoing FIG. 3, and achieve the same technical effects. To avoid repetition, details are not described herein again.

Figure 6:
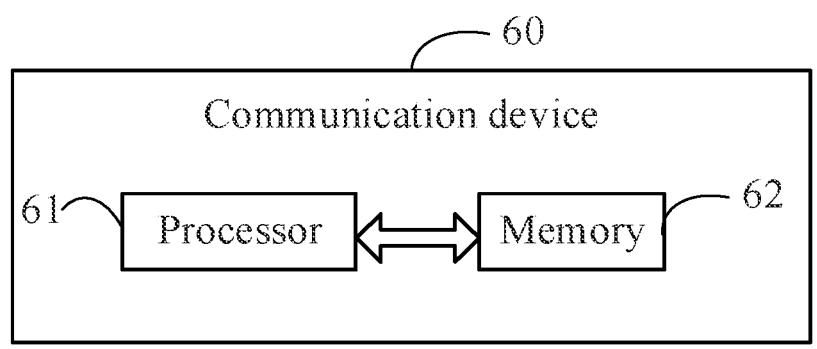
FIG. 6 is a schematic structural diagram of a communication device according to an embodiment of this application.

In some embodiments, as shown in FIG. 6, an embodiment of this application further provides a communication device 60, including a processor 61, a memory 62, and a program or an instruction stored in the memory 62 and capable of being run on the processor 61, and the program or the instruction, when executed by the processor 61, implements the processes of the embodiments of the transmission control method, and can achieve the same technical effects. To avoid repetition, details are not described herein again.

Figure 7:
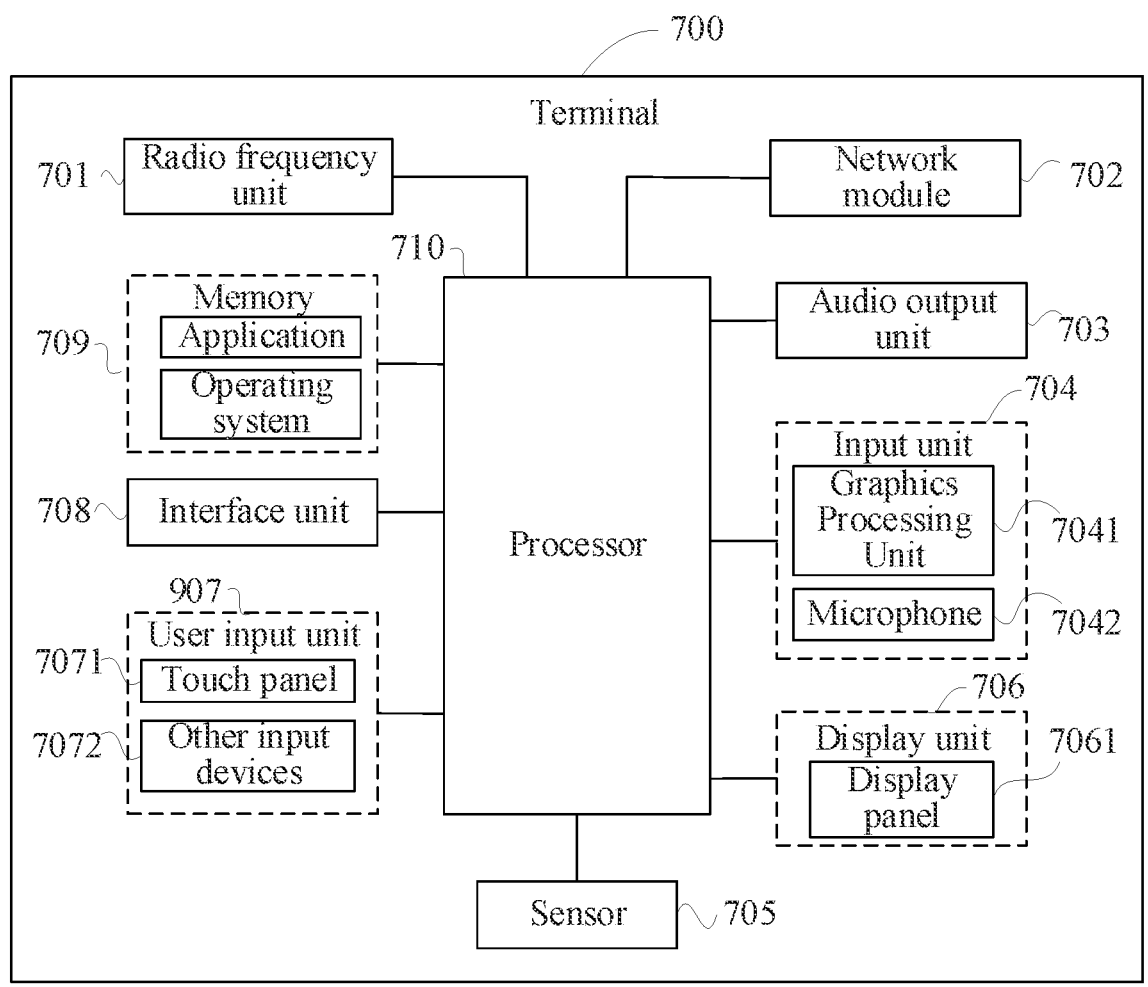
FIG. 7 is a schematic structural diagram of a terminal according to an embodiment of this application.

FIG. 7 is a schematic diagram of a hardware structure of a terminal for implementing an embodiment of this application.

The terminal 700 includes but is not limited to: components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that, the terminal 700 may further include a power supply (such as a battery) for supplying power to the components. The power supply may be logically connected to the processor 710 by using a power management system, thereby implementing functions such as charging, discharging, and power consumption management by using the power supply management system. The terminal structure shown in FIG. 7 constitutes no limitation on the terminal, and the terminal may include more or fewer components than those shown in the figure, or some components may be combined, or a different component deployment may be used. Details are not described herein again.

It should be understood that, in this embodiment of this application, the input unit 704 may include a Graphics Processing Unit (GPU) 7041 and a microphone 7042. The graphics processing unit 7041 performs processing on image data of a static picture or a video that is obtained by an image acquisition device (for example, a camera) in a video acquisition mode or an image acquisition mode. The display unit 706 may include a display panel 7061, the display panel 7061 may be configured in a form such as a liquid crystal display or an organic light-emitting diode. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include, but not limited to, a physical keyboard, a functional key (such as a volume control key or a switch key), a track ball, a mouse, and a joystick. Details are not described herein again.

In this embodiment of this application, the radio frequency unit 701 receives downlink data from a network side device, and sends the downlink data to the processor 710 to be processed. In addition, the radio frequency unit 701 sends uplink data to the network side device. The radio frequency unit 701 usually includes but is not limited to an antenna, at least one amplifier, a transceiver, a coupler, a low noise amplifier, a duplexer, and the like.

The memory 709 may be configured to store a software program or an instruction and various data. The memory 709 may mainly include a program storage or instruction area and a data storage area. The program storage or instruction area may store an operating system, an application or an instruction required by at least one function (for example, a sound playing function and an image playing function), or the like. In addition, the memory 709 may include a cache random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one magnetic disk storage device, a flash storage device, or other volatile solid-state storage devices.

The processor 710 may include one or more processing units. In some embodiments, the processor 710 may integrate an application processor and a modem processor. The application processor mainly processes an operating system, a user interface, an application or an instruction, and the like. The modem processor mainly processes wireless communication, such as a baseband processor. It may be understood that the modem processor may either not be integrated into the processor 710.

The processor 710 is configured to cancel, in a case that a first message meets a preset condition, configured transmission, where the first message includes at least one of an RTS message or a CTS message.

In some embodiments, the processor 710 is further configured to: cancel, in a case that a transmission resource of the first message collides with a configured uplink transmission resource, transmission on the configured uplink transmission resource.

In some embodiments, the processor 710 is further configured to: cancel, in a case that the terminal 700 receives a CTS message from a serving base station without sending an RTS message, and a time domain resource of CG uplink transmission of the terminal 700 overlaps with a channel occupancy time indicated by the CTS message, the CG uplink transmission.

In some embodiments, the processor 710 is further configured to: cancel, in a case that the terminal 700 receives a CTS message from a serving base station without sending an RTS message, and the time domain resource of the CG uplink transmission of the terminal 700 overlaps with a channel occupancy time indicated by the CTS message, CG uplink transmission on a time domain resource overlapping with the channel occupancy time, or CG uplink transmission on all time domain resources overlapping with the channel occupancy time.

In some embodiments, the processor 710 is further configured to: skip, in a case that the terminal 700 detects an RTS message sent from a serving base station without being required to send a CTS message, performing a specific detection within a channel occupancy time indicated by the RTS message, such as detections of the CTS message, a PDCCH, and/or an SPS PDSCH.

The terminal 700 provided in this embodiment of this application can implement all processes implemented by the method embodiment shown in FIG. 2 or FIG. 3, and achieve the same technical effects. To avoid repetition, details are not described herein again.

Figure 8:
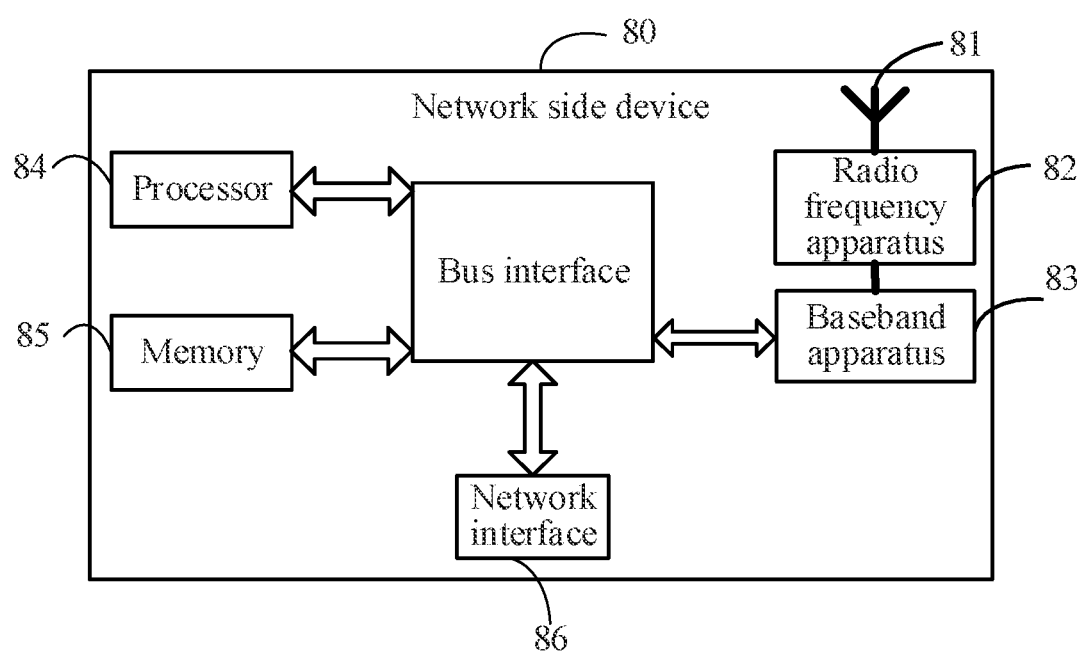
FIG. 8 is a schematic structural diagram of a network side device according to an embodiment of this application.

For example, an embodiment of this application further provides a network side device. As shown in FIG. 8, the network side device 80 includes: an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the information to the baseband apparatus 83 for processing. In a downlink direction, the baseband apparatus 83 processes information to be sent, and sends the information to the radio frequency apparatus 82, The radio frequency apparatus 82 processes the received information and sends the information by using the antenna 81.

The frequency band processing apparatus may be located in the baseband apparatus 83. The method performed by the network side device in the foregoing embodiments may be implemented in the baseband apparatus 83. The baseband apparatus 83 includes a processor 84 and a memory 85.

The baseband apparatus 83 may include, for example, at least one baseband plate. A plurality of chips are disposed on the baseband plate. As shown in FIG. 8, one of the plurality of chips is, for example, the processor 84, and is connected to the memory 85, to invoke a program in the memory 85 to perform network device operations in the foregoing method embodiments.

The baseband apparatus 83 may further include a network interface 86, configured to exchange information with the radio frequency apparatus 82. The interface is, for example, a Common Public Radio Interface (CPRI).

For example, the network side device in this embodiment of the present disclosure further includes: an instruction or a program stored in the memory 85 and capable of being run on the processor 84, where the processor 84 may invoke the instruction or the program in the memory 85 to: cancel, in a case that a transmission resource of an RTS message and/or a CTS message collides with a configured downlink transmission resource, transmission on the configured downlink transmission resource.

An embodiment of this application further provides a readable storage medium, where the readable storage medium stores a program or an instruction, and the program or the instruction, when executed by a processor, implements the processes of the embodiments of the transmission control method, and can achieve the same technical effects. To avoid repetition, details are not described herein again. The processor is the processor in the terminal of the foregoing embodiments. The readable storage medium includes a computer-readable storage medium, for example, a computer ROM, a Random Access Memory (RAM), a magnetic disk, or an optical disc.

An embodiment of this application further provides a chip, where the chip includes a processor and a communication interface, the communication interface is coupled with the processor, and the processor is configured to run a program or an instruction of a network side device, to implement the processes of the embodiments of the transmission control method, and can achieve the same technical effects. To avoid repetition, details are not described herein again.

It should be understood that, the chip mentioned in this embodiment of this application may also be referred to as a system-level chip, a system chip, a chip system, a system-on-chip, or the like.

It should be noted that, in this specification, terms "comprise", "include", and any variants thereof are intended to cover a non-exclusive inclusion. Therefore, a process, a method, an object, or an apparatus that includes a series of elements only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses that include such elements. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, or combined. In addition, features described by referring to some examples may be combined in other examples.

Through the foregoing description in the foregoing implementations, a person skilled in the art can clearly learn that the foregoing embodiment methods may be implemented by using software in combination with a necessary universal hardware platform. The embodiment methods may also be implemented by using hardware. In some embodiments, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A transmission control method, comprising:
   canceling, by a communication device when a first message meets a preset condition, configured transmission, wherein
   the first message comprises at least one of a Request-To-Send (RTS) message sent by the communication device or a Clear-To-Send (CTS) message sent by the communication device,
   wherein when the communication device being a terminal, canceling the configured transmission comprises:
   canceling, by the terminal when a transmission resource of the first message collides with a configured uplink transmission resource, transmission on the configured uplink transmission resource for the first message to be transmitted on the transmission resource of the first message, or
   wherein when the communication device being a network side device, canceling the configured transmission comprises:
   canceling, by the network side device when a transmission resource of the first message collides with a configured downlink transmission resource, transmission on the configured downlink transmission resource for the first message to be transmitted on the transmission resource of the first message.

2. The transmission control method according to claim 1, further comprising:
   canceling, by the communication device, when communication device comprises a terminal that receives a CTS message from a serving base station without sending an RTS message, and a time domain resource of Configured Grant (CG) uplink transmission of the terminal overlaps with a channel occupancy time indicated by the CTS message, the CG uplink transmission for the first message to be transmitted in the channel occupancy time.

3. The transmission control method according to claim 2, wherein the canceling the CG uplink transmission comprises any one of the following:
- canceling, by the terminal, CG uplink transmission on a time domain resource overlapping with the channel occupancy time; or
- canceling, by the terminal, CG uplink transmission on all time domain resources overlapping with the channel occupancy time.

4. A transmission control method, comprising:
- in response to that a terminal detects a Request-To-Send (RTS) message sent from a serving base station without the terminal having to send a Clear-To-Send (CTS) message to the serving base station, skipping, by the terminal within a channel occupancy time indicated by the RTS message, listening for a CTS message or detecting a Physical Downlink Control Channel (PDCCH) or a Semi-Persistent Scheduling (SPS) Physical Downlink Shared Channel (PDSCH).

5. A transmission control apparatus, comprising: a memory having a computer program stored thereon; and a processor, wherein the computer program, when executed by the processor, causes the processor to perform a transmission control method, comprising:
- when a first message meets a preset condition, canceling configured transmission, wherein
- the first message comprises at least one of a Request-To-Send (RTS) message sent by the transmission control apparatus or a Clear-To-Send (CTS) message sent by the transmission control apparatus,
- wherein when the transmission control apparatus being a terminal, canceling the configured transmission comprises:
- canceling, by the terminal when a transmission resource of the first message collides with a configured uplink transmission resource, transmission on the configured uplink transmission resource for the first message to be transmitted on the transmission resource of the first message, or
- wherein when the transmission control apparatus being a network side device, canceling the configured transmission comprises:
- canceling, by the network side device when a transmission resource of the first message collides with a configured downlink transmission resource, transmission on the configured downlink transmission resource for the first message to be transmitted on the transmission resource of the first message.

6. The transmission control apparatus according to claim 5, wherein the transmission control method further comprises:
- canceling, by the transmission control apparatus, when the transmission control apparatus comprises a terminal that receives a CTS message from a serving base station without sending an RTS message, and a time domain resource of Configured Grant (CG) uplink transmission of the terminal overlaps with a channel occupancy time indicated by the CTS message, the CG uplink transmission for the first message to be transmitted in the channel occupancy time.

7. The transmission control apparatus according to claim 6, wherein the canceling the CG uplink transmission comprises any one of the following:
- canceling, by the terminal, CG uplink transmission on a time domain resource overlapping with the channel occupancy time; or
- canceling, by the terminal, CG uplink transmission on all time domain resources overlapping with the channel occupancy time.

8. A communication device, comprising a processor, a memory, and a computer program or an instruction stored in the memory and capable of being run on the processor, and the program or the instruction, when executed by the processor, causes the communication device to implement the transmission control method according to claim 6.

9. A non-transitory computer-readable medium storing a program or an instruction, and when executed by a processor, causes the processor to implement the transmission control method according to claim 1.

10. A non-transitory computer-readable medium storing a program or an instruction, and when executed by a processor, causes the processor to implement the transmission control method according to claim 4.

* * * * *